United States Patent
Disher (10) Patent No.: US 10,167,987 B2
(45) Date of Patent: Jan. 1, 2019

(54) PIPELINE PIG LAUNCH APPARATUS

(71) Applicant: ROTO-LAUNCH INC., Grande Prairie (CA)

(72) Inventor: Malcolm Murhl Disher, Grande Prairie (CA)

(73) Assignee: ROTO-LAUNCH INC., Grande Prairie (CA)

( * ) Notice: Subject to any disclaimer, the term of this patent is extended or adjusted under 35 U.S.C. 154(b) by 178 days.

(21) Appl. No.: 15/180,856

(22) Filed: Jun. 13, 2016

(65) Prior Publication Data
US 2016/0363249 A1 Dec. 15, 2016

Related U.S. Application Data

(60) Provisional application No. 62/175,065, filed on Jun. 12, 2015.

(51) Int. Cl.
| | | |
|---|---|---|
| *F16L 55/46* | (2006.01) | |
| *B08B 9/055* | (2006.01) | |
| *F16L 101/12* | (2006.01) | |
| *F16L 101/30* | (2006.01) | |

(52) U.S. Cl.
CPC .............. *F16L 55/46* (2013.01); *B08B 9/055* (2013.01); *F16L 2101/12* (2013.01); *F16L 2101/30* (2013.01)

(58) Field of Classification Search
CPC ... F16L 55/46; F16L 2101/12; F16L 2101/30; B08B 9/055; B65G 25/02; B65G 25/08
See application file for complete search history.

(56) References Cited

U.S. PATENT DOCUMENTS

| | | | |
|---|---|---|---|
| 2,648,425 | A | 8/1953 | Perrin |
| 3,656,609 | A | 4/1972 | Hideo et al. |
| 3,890,889 | A | 6/1975 | Fishburne |
| 4,401,133 | A | 8/1983 | Lankston |
| 4,736,482 | A | 4/1988 | Lankston |
| 5,139,576 | A | 8/1992 | Davis |
| 5,339,983 | A | 8/1994 | Caple |
| 5,884,656 | A | 3/1999 | Smith |
| 5,913,637 | A | 6/1999 | Rajabali et al. |
| 6,022,421 | A | 2/2000 | Bath et al. |
| 10,001,240 | B1 * | 6/2018 | Dray ....................... F16L 55/46 |
| 2007/0056609 | A1 * | 3/2007 | Schlosser ................ B08B 9/055 134/22.11 |

FOREIGN PATENT DOCUMENTS

GB     1179978    *  2/1970  .............. F16L 55/38

* cited by examiner

*Primary Examiner* — Laura C Guidotti
(74) *Attorney, Agent, or Firm* — Bennett Jones LLP (57) ABSTRACT

An in-line pig launching device includes a pair of guide rails on which a pig is stored before launching, a drive system for moving the pig along the guide rails and a drop tube at an end of the guide rails for accommodating the pig just before launching. The drop tube includes a guide rail extension that holds the pig in a proper orientation, against tipping, within the drop tube. The guide rail extension is linked to the drive system, such that only when the drive system moves to move a next pig will the guide rail extension release the pig from the drop tube.

10 Claims, 8 Drawing Sheets

PIPELINE PIG LAUNCH APPARATUS

FIELD OF THE INVENTION

The invention relates to a launching apparatus for pipeline pigs.

BACKGROUND OF THE INVENTION

Multiple pig launching apparatus are commonly used for cleaning and inspecting pipelines. Since pipelines can collect water or other debris, a device called a "pig" can be introduced from a launcher into an upstream end of a pipeline. The launcher releases the pig and the fluid flow in the pipeline carries the pig and debris and/or liquids from the pipeline to a receiver or pig trap. The process of moving a pig through a pipeline is called pigging.

In pigging operations, a useful launching apparatus can operate automatically to regularly drop pigs. Reliability is very important considering the remote locations of these apparatus and the time and labor costs and operator risk to address malfunction.

SUMMARY OF THE INVENTION

In accordance with an aspect of the present invention, there is provided a pig launching apparatus comprising: a frame including a first guide rail with a first pig supporting surface and a second guide rail with a second pig supporting surface, the first guide rail extending substantially parallel to, and spaced apart from, the second guide rail, the first guide rail and the second guide rail configured to support a pig on the first and second pig supporting surfaces; a drop tube at an end of the frame into which the pig is positioned for dropping into a pipeline; a drive system including a pushing finger protruding into the frame, the drive system configured to move through a cycle from a starting position through a forward stroke to move the pushing finger toward the drop tube and a rearward stroke to pull the pushing finger back to the starting position, the forward stroke moving the pushing finger to push the pig axially along the first and second pig supporting surfaces; an extension of the guide rail in the drop tube, the extension of the guide rail being moveable between (i) a support position for supporting the pig in a substantially vertical position in the drop tube and (ii) a release position wherein it can release the pig to drop out of the drop tube; and a lock mechanism for the extension, the lock mechanism configured to alternately lock the extension in the support position and release the extension for movement to the release position, the lock mechanism configured to release the extension when the drive system moves through the rearward stroke.

In accordance with another aspect of the present invention, there is provided a method for launching a pig into a pipeline, comprising: loading a pig into a pig launching device to rest on a pair of guide rails; driving a drive system to push the pig along the guide rails into a drop tube at an end of the guide rails; accommodating the pig in the drop tube on a guide rail extension, the guide rail extension holding the pig in a proper orientation, against tipping, within the drop tube; driving the drive system to move a next pig along the guide rails and into the drop tube; and actuating the guide rail extension release the pig from the drop tube to thereby launch the pig into the pipeline, wherein driving the drive system to move a next pig actuates the guide rail extension release the pig from the drop tube.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF VARIOUS EMBODIMENTS

The description that follows and the embodiments described therein, are provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. The drawings are not necessarily to scale and in some instances proportions may have been exaggerated in order more clearly to depict certain features.

As illustrated in the Figures, the present pig launching apparatus 2 launches pigs 4 (including pig 4i) into a pipeline 6. There may be an interface between the apparatus and the pipeline. For example, piping transition spool 90 may be positioned between apparatus 2 and pipeline 6. Piping transition spool 90 allows the pipeline to remain in operation while the pig is launched into the pipeline. Piping transition spool 90 may include an inlet 92 from the gas pipeline and an outlet 94 to the pipeline 6 to be pigged.

Apparatus 2 includes a housing 8 that is connected to the pipeline is configured to operate as a pressure vessel to permit communication to the interior of the pipeline 6. The housing may be constructed of a rolled steel plate closed at one end by a hemispherical head.

Housing 8 includes a portion formed as outlet port 8a on the bottom, generally at one end of the housing, connecting the housing directly or indirectly (for example, via spool 90) to the pipeline. A pig passes through outlet port 8a to enter the pipeline.

Housing 8 further includes a closure 12 such as a quick closure to allow for loading of pigs into the housing and servicing of internal components.

Apparatus 8 further includes an internal system within the housing including: a carriage frame 10 for supporting one or more pigs 4 in series. Frame 10 extends from a launching end 10a, which is the end adjacent outlet port 8a, to a loading end 10b adjacent closure 12, a driver for moving pigs 4 along frame 10 toward launching end 10a and for moving one pig at a time into a launching mechanism that receives a pig from frame 10, positions the pig over the drop tube and releases the pig to pass through the drop tube.

Pigs 4 may take various forms, such as spherical, dart-shaped, etc. The current pig launching apparatus is intended to handle pigs that are dart-shaped that include a body with a leading end 4a (i.e. sometimes called a nose), a long axis x extending from the leading end to a trailing end and one or more annular fins 4b that extend radially out from the stem of the body in a substantially orthogonal orientation relative to the long axis of the pig. This type of pig is commonly called a utility disc pig.

Frame 10 is elongate and accommodates the one or more pigs in a single line. For example, the frame 10 includes a pair of spaced apart elongate guide rails 18. Each guide rail 18 extends from launching end 10a to loading end 10b. The guide rails extend parallel to each other such that there is an elongate space between them. The main axis of the apparatus along which the pigs are moved passes through elongate space, with guide rails extending substantially in parallel with and on either side of the main axis. Guide rails 18 and the main axis are oriented substantially horizontally within housing 8.

The pigs are each accommodated with their stem positioned in the space between guide rails 18 and are each held in a substantially vertical orientation with one of their fins 4b resting on either side on the two spaced apart guide rails. The leading end 4a of the pig usually points down. A plurality of pigs may be installed in a series, one in front of the other, in a single line along the length of the guide rails 18.

The frame further may include support legs 20 that retain the guide rails 18 in position within the housing.

Pigs 4 may be introduced to the pig launcher through closure 12. Pigs 4 are installed in the space between guide rails 18. The pigs are placed one at a time onto the guide rails with each pig supported with one of its fins resting simultaneously on both guide rails 18 and its stem in the elongate space between the guide rails.

The driver moves pigs 4 along the guide rails. The driver includes a plurality of fingers 22 mounted in spaced, in-line relationship alongside the frame. Each of the plurality of fingers protrudes from the same guide rail 18 into the space between the guide rails where the pigs are supported. The number of fingers and their respective in-line finger to finger spacing is determined by the length of the frame and the expected diameter of a pig to be installed so that the space between each two fingers is appropriate to accommodate one pig. There is at least one finger positioned to protrude behind each pig.

Fingers 22 are movable in unison axially relative to the frame to push against the pigs along the frame. In particular, each finger, as it is moved forward, pushes the pig that is directly in front of that finger forward toward launching end 10a. In this embodiment, fingers 22 are moveable forward along frame 10 for a limited distance and then the fingers are retractable and are moveable back to become inserted behind next pigs to move them forward.

For example, fingers 22 each have a mounted end and an outboard end. The outboard ends each protrude into the elongate space and the mounted ends each are mounted with a pivot connection 24 to a drive bar 26. The fingers are each configured by pivot connection to rotate horizontally from the drive bar and their rotation is controlled by an actuator bar 28 that extends alongside and is parallel with drive bar 26.

While the fingers are pivotally connected to the drive bar, fingers 22 protrude through slots in actuator bar 28. Fingers 22 move all together with movement of drive bar 26 and the fingers are all driven about their pivot connections 24 simultaneously by actuator bar 28. Drive bar 26 and actuator bar 28 are mounted on bearings 29 at a side of frame 10. Bearings 29 facilitate axial movement of these bars parallel to and alongside of the elongate space of the frame.

Drive bar 26 and actuator bar 28 are connected by a link arm 27 such that actuator bar 28 moves axially with drive bar 26 along one length, but actuator bar 28 acts as a idler and can be stopped while drive bar 26 continues to move axially. This simultaneous, axial movement of drive bar 26 relative to actuator bar 28 causes the fingers to be maintained at a set protruding angle when the bars 26, 28 are moving axially together. However, when actuator bar 28 is stopped while the drive bar 26 continues to move, the fingers are moved with drive bar (due to the pivot connections 24 between fingers and bar 26) but the edges of the slots (through which the fingers each extend) in actuator bar 28 are moved leaving the fingers unsupported and movement of bar 26 allows the fingers to be pivoted. This alternating (i) support of the fingers by slots and (ii) movement of slots to free the fingers, allows the fingers to be sometimes during (i) held in a protruding position in the elongate space and alternately, during (ii) allowed to be pivoted about their pivot connections 24 to be retracted from the elongate space.

Drive bar 26 is driven linearly by a motive source.

Motive source may include, for example a rod driven by hydraulic, pneumatic or electric drivers. For example, one motive source may include a hydraulic cylinder.

In the illustrated embodiment, an external drive cylinder 32 is employed which is connected by a linkage to the drive bar 26. Drive cylinder 32 in this embodiment is a dual acting pneumatic cylinder which generates a linear force through its rod and external levers 30c, creating a rotational force on a drive shaft 30b that communicates inside the housing. Drive shaft 30b connects to another lever linkage 30a inside the housing 8. Lever 30a communicates a linear force upon drive bar 26 through a connection 81, For each normal operation to launch a pig, drive cylinder 32 drives the drive bar 26 through a cycle of linear motion: first one way toward launching end and then back in the other direction.

Cylinder 32 can be operated manually to complete a cycle, but generally a control system is employed to automate the operation. A signal such as a remote signal, an automatic signal such as from a timer or from a manual switch to causes the cyclic, reciprocating movement of cylinder 32 which thereby reciprocates drive bar 26 from a starting position through a positioning and launching position to a reset position which is same as the starting position.

Figure 1:
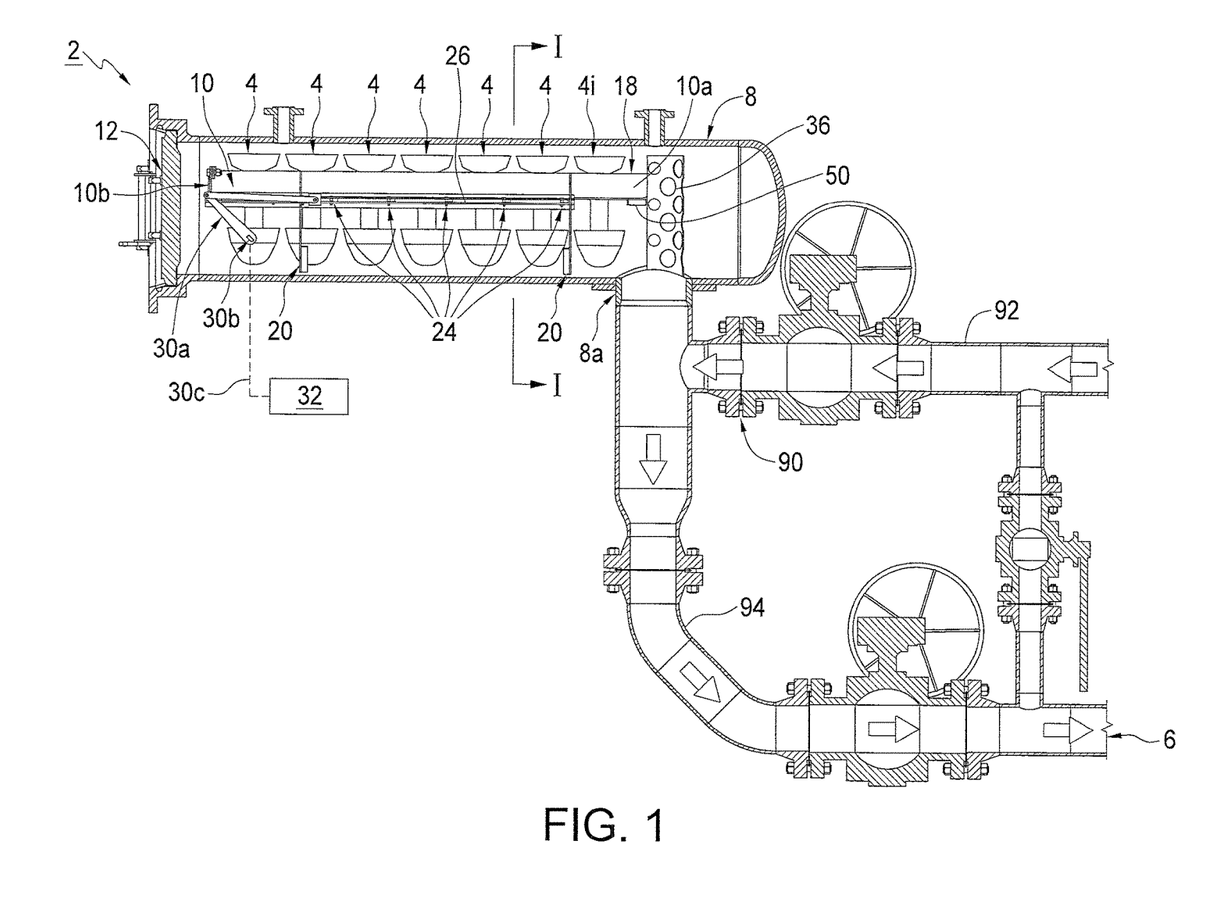
FIG. 1 is a schematic illustration of a pig launching apparatus.
Figure 1A:
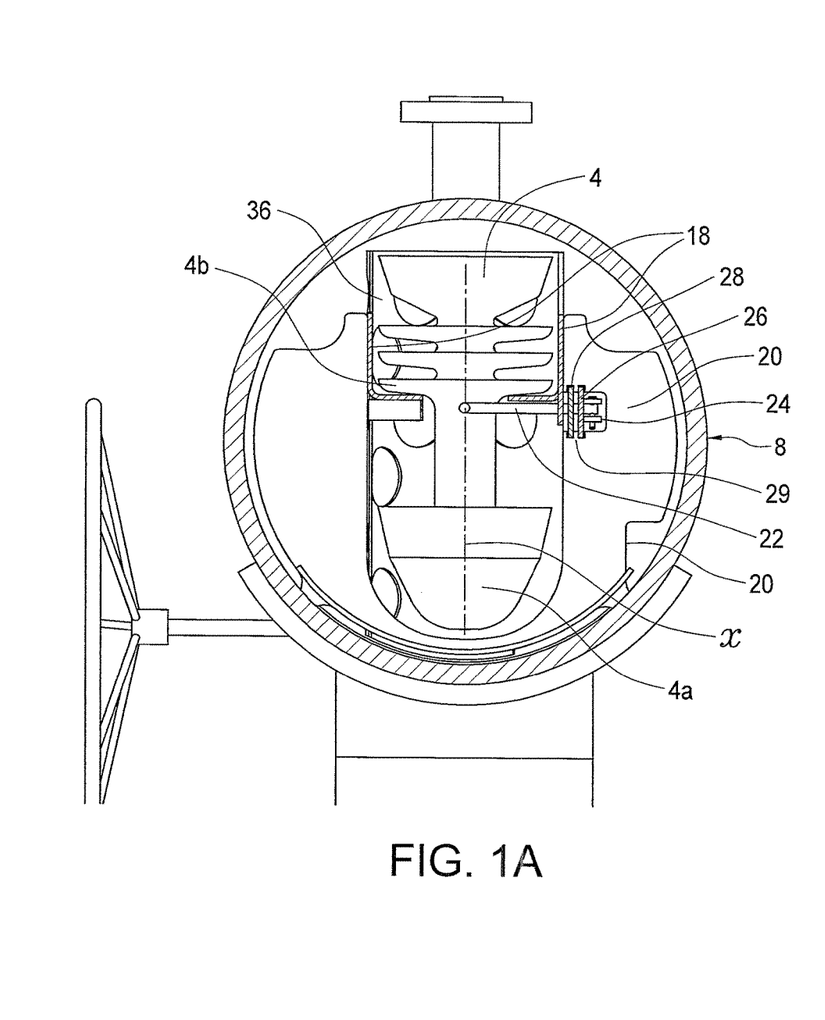
FIG. 1A is a sectional view along line I-I of FIG. 1.
Figure 2:
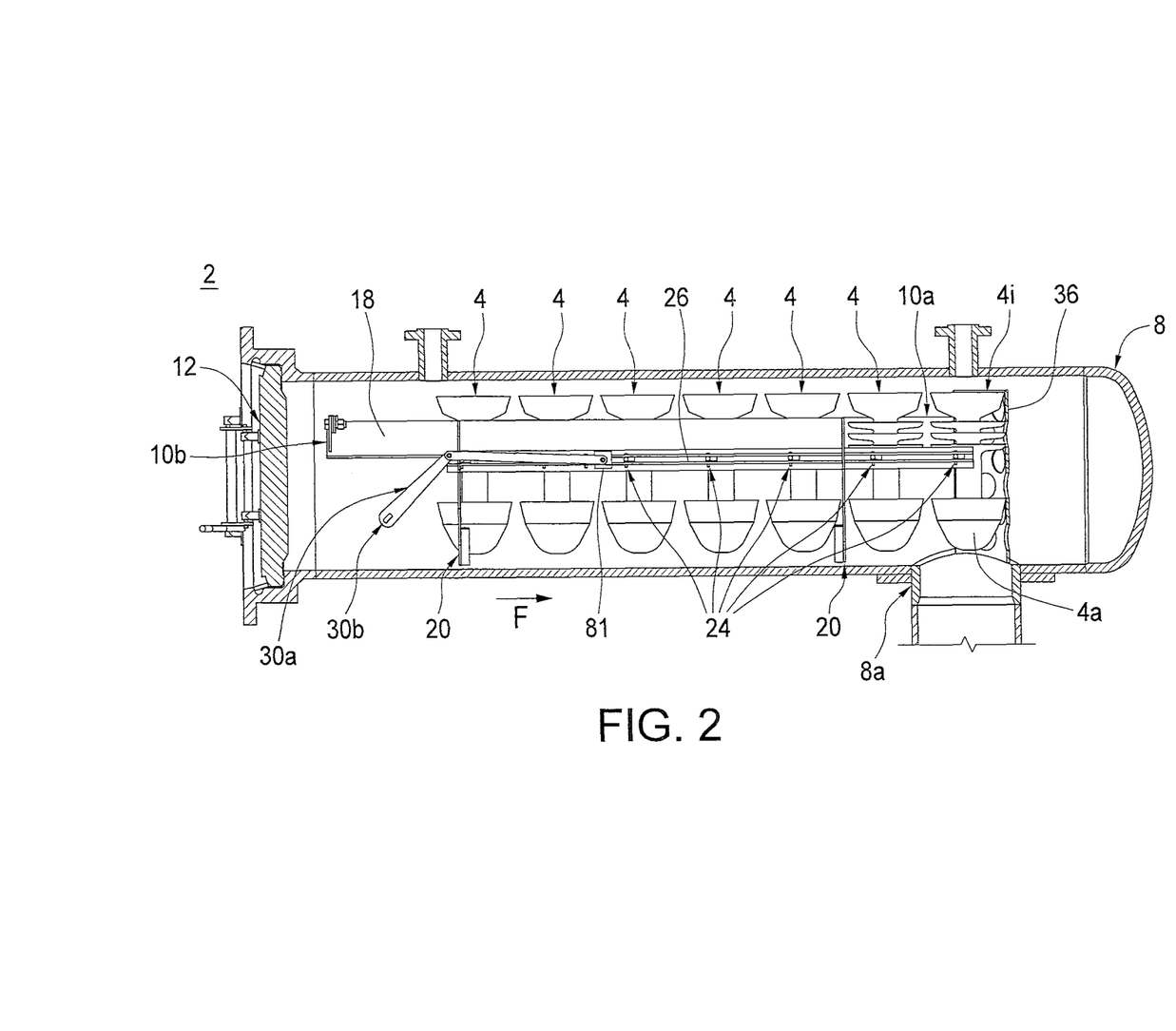
FIG. 2 is a schematic illustration of the pig launching apparatus of FIG. 1 at the mid cycle of operation, which is a forward position with a portion of the closest side rail 18 removed to permit improved illustration.
Figure 4:
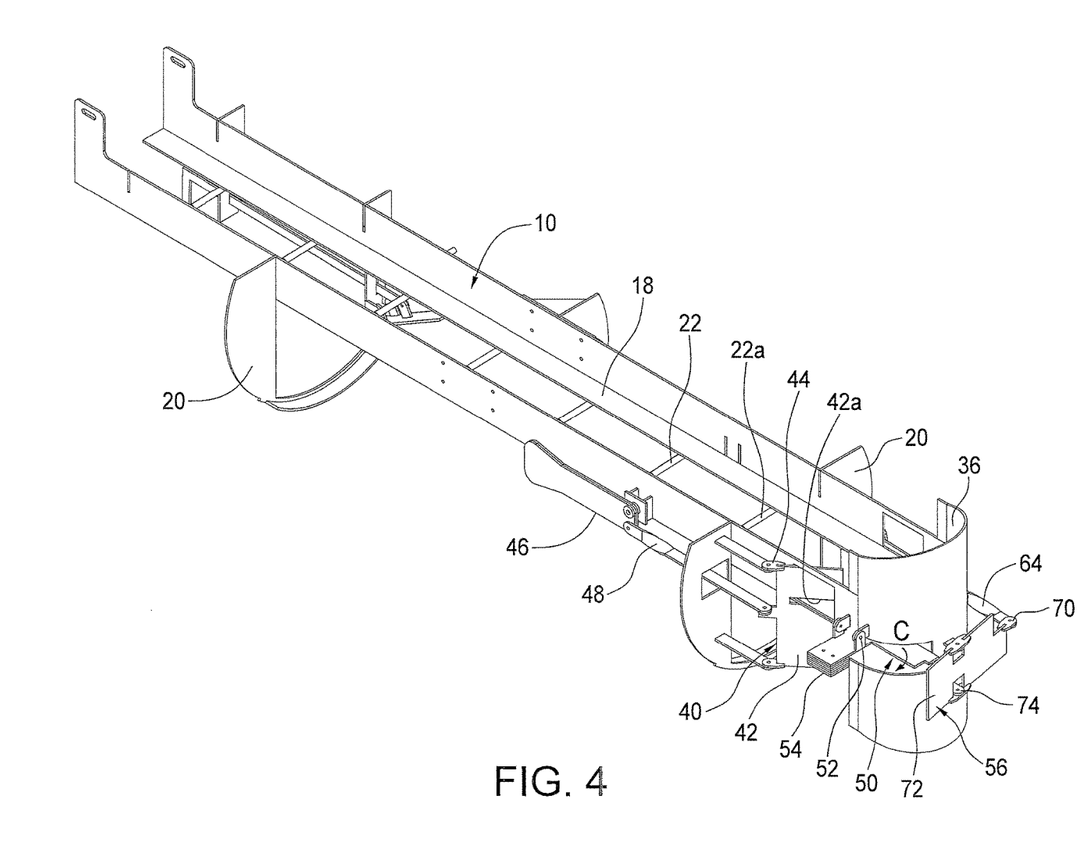
FIG. 4 is a first side, front perspective view of the internal components of one embodiment of a pig launching apparatus.
Figure 5:
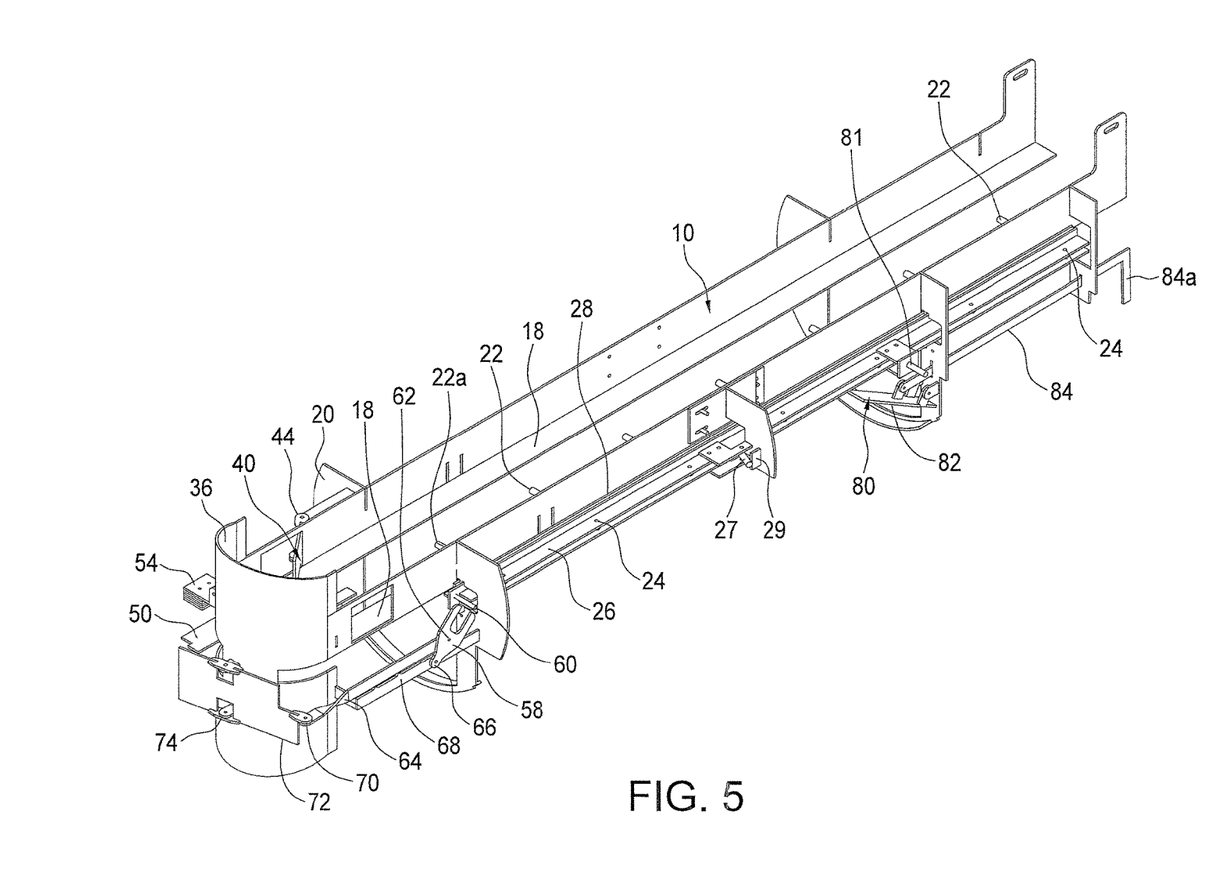
FIG. 5 is a second side, front perspective view of the internal components of one embodiment of a pig launching apparatus.

From the starting position as shown in FIGS. 1, 4 and 5, reverse movement of the cylinder's rod drives drive bar 26 forwardly (arrow F, FIG. 2). This forward movement (arrow F) moves fingers 22 forwardly toward launching end 10*a*. When the cylinder is in its most extended position as illustrated in FIG. 2, the fingers have completed their forward motion.

During the forward movement (arrow F), the fingers 22 are in a protruding position (wherein fingers 22 protrude into the space between rails 18 and are supported in that position by actuator bar 28).

Figure 3:
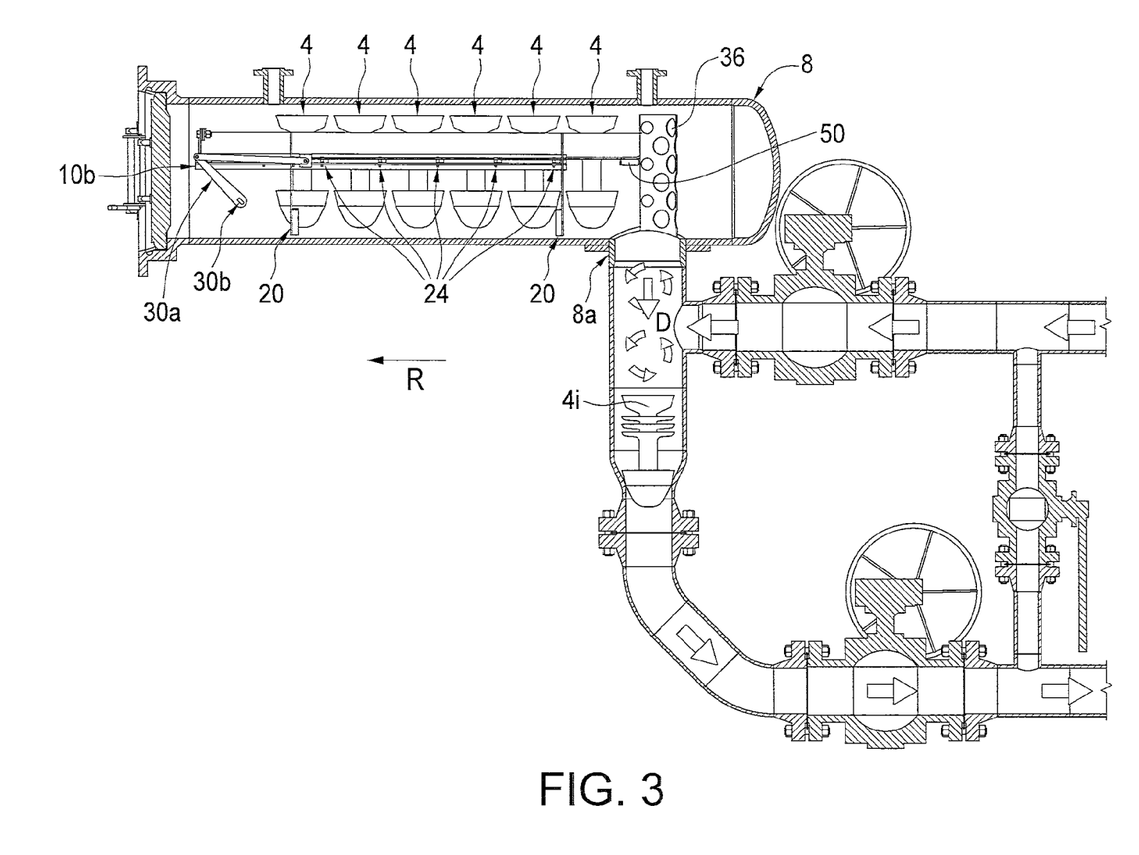
FIG. 3 is a schematic illustration of the pig launching apparatus of FIG. 1 after a full cycle of operation and as a pig is being launched.

With reference to FIG. 3, the cycle continues with reverse movement of rod 30 by cylinder, This reverse movement pulls bar 26 back (arrow R) while actuator bar 28 is freed from simultaneous movement with the drive bar. Movement of bar 26 axially back toward loading end 10*b* pulls the fingers back, but differential movement of actuator bar 28 relative to drive bar 26 releases fingers 22 from the support of the actuator bar, and in particular fingers are released from support by the edges of one end of the slots in the actuator bar. Eventually, while drive bar 26 continues to move the fingers with actuator bar 28 stationary, actuator bar 28 drives the fingers to move and be pivoted from the protruding position to a retracted position. Particularly, this driving of fingers to retract is caused by an opposite end of the slot being driven against the finger residing in that slot, as drive bar moves fingers 22 and the actuator bar remains stationary. This pivoting of fingers pulls fingers 22 out of the space between rails 18 and out of contact with the pigs and allows the fingers to move back with drive bar 26. Continuing rearward movement (arrow R) of drive bar 26 carries the plurality of fingers 22 backward but they do not move the pigs.

Eventually the link arm 27 between drive bar 26 and actuator bar 28 forces the actuator bar to catch up with the drive bar. At this point, fingers 22 are pivoted out by the actuator bar 28 to again protrude into the space between rails 18. Eventually drive bar reaches its most rearward position, which is the position (FIG. 1) from which the aforementioned operation was initiated.

This reciprocating axial movement of bar 26 is cyclic where fingers 22 are pivoted and moved between (a) the protruding position when the fingers and bar 26 are moved axially forwardly toward launching end 10*a* and (b) the retracted position when fingers 22 and bar 26 are moved rearwardly toward loading end 10*b*. Fingers 22: (a) when in the protruding position move the pigs that are supported on rails 18 forwardly (arrow F) toward launching end 10*a* and (b) when in the retracted position, pull out from behind the pigs and move back (arrow R) to be inserted behind a next pig. In the retracted position, the fingers 22 can bypass the pigs without acting on them and as such the pigs remain in the last place they were pushed by fingers during the forward stroke of bar 26. Successive repetition of the aforementioned cyclic, reciprocating movement of drive bar 26 and the associated pivoting and movement of fingers 22, causes pigs 4 to be successively moved forwardly (arrow F) along frame 10.

As each pig reaches launching end 10*a*, a next successive cycle of movement causes the frontmost finger 22*a* on bar 26 to push the leading pig 4*i* forwards, substantially horizontally into the launching mechanism including a drop tube 36. That frontmost finger 22*a* then is pulled back with bar 26 and retracts, leaving the leading pig 4*i* in the drop tube. In the illustrated embodiment, drop tube 36 is a semi-cylindrical wall positioned at the end of guide rails 18. The drop tube spans across the open end of elongate space and defines inner facing semi-cylindrical walls within the housing. The drop tube is positioned in housing 8 in substantial vertical alignment with outlet port 8*a*.

Once in the drop tube, the pig can be dropped by gravity to pass through outlet port 8*a* to enter pipe 6. To mitigate concerns that the pig may become jammed in the drop tube and fail to fall properly out of the drop tube, a launching mechanism may be employed that receives a pig from frame 10, positions the pig in the drop tube and releases the pig to pass through the drop tube. The launching mechanism may further include one or more features.

Figure 6:
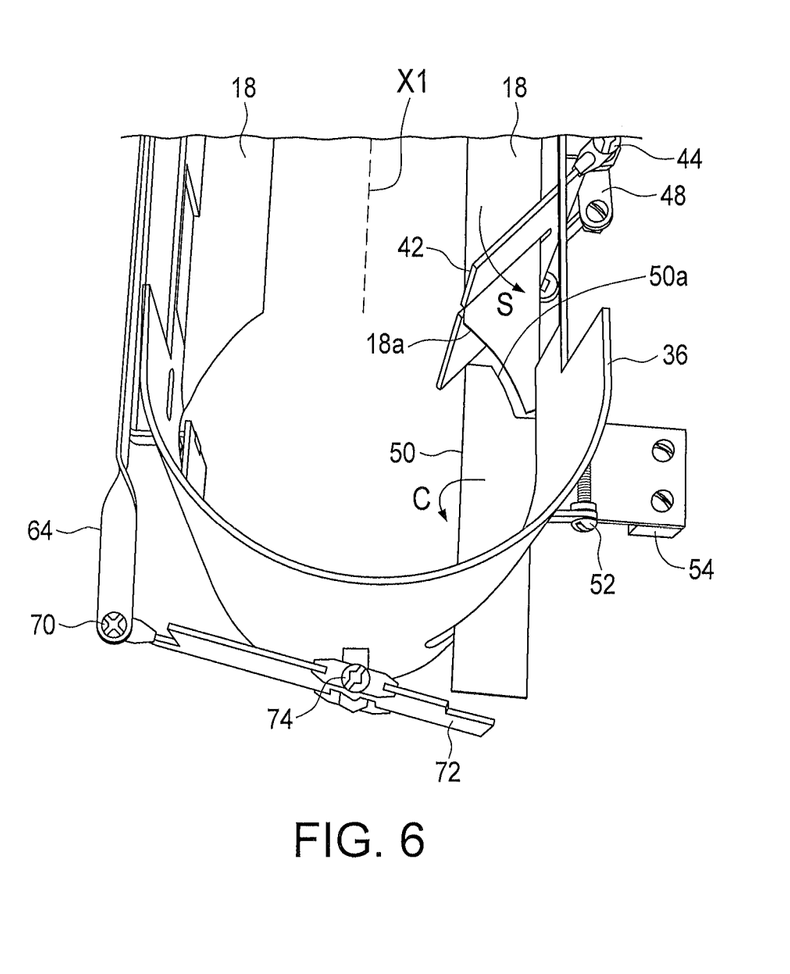
FIG. 6 is a top perspective view of the launching end of an internal component of a pig launching apparatus.
Figure 7:
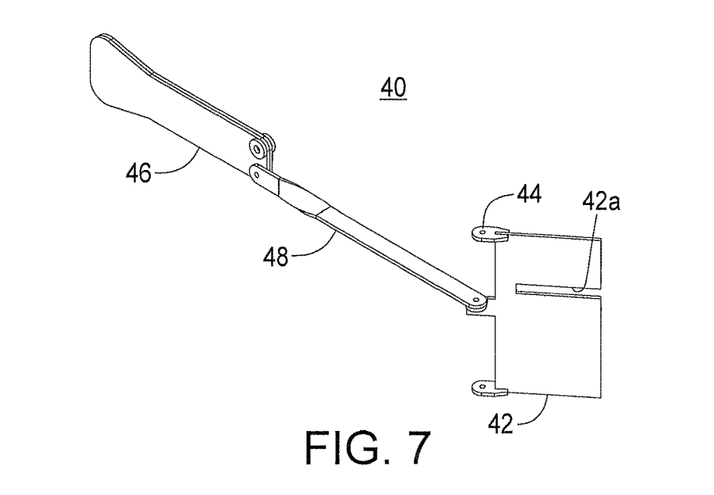
FIG. 7 is a perspective view of a pig stop useful in a pig launching apparatus.
Figure 8:
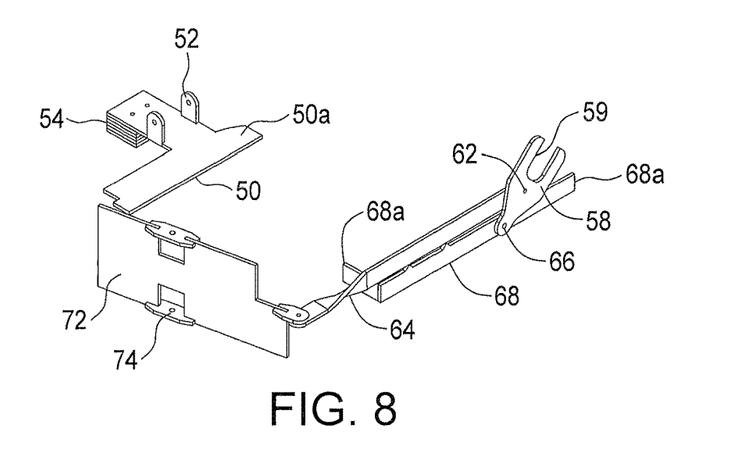
FIG. 8 is a perspective view of a pig positioning mechanism useful in a pig launching apparatus.

A pig stop 40, best shown in FIGS. 4 and 6, may be provided to hold the pigs at launching end in place against forces such as of turbulent fluid flows. Pig stop 40 may mitigate the risk of pigs creeping forward in along guide rails 18 and prevent the leading pig 4*i* from moving back out of the drop tube and onto guide rails 18 once the pig has been pushed into drop tube 8*a*. Pig stop 40 in this embodiment, includes a flapper 42 that normally protrudes onto a guide rail and assumes a blocking position in the path of pig movement on rails 18. In the blocking position, pig stop 40 blocks passive forward movement, and all reverse movement, of pigs therepast. However, forward (arrow F), driver-induced force on a pig can move pig stop 40, arrow S, out of the way to permit a pig to be pushed into the drop tube but is biased to return to a blocking position to prevent rearward movement, arrow R, of a pig out of the drop tube. Flapper 42 is pivotally connected as at connection 44 to frame 10. Flapper 42 can be biased by various means such as a spring or, as illustrated here, a counterweight 46 to rotate about connection 44 to return to the blocking position. Counterweight 46 is connected through a linkage 48 to flapper 42. Counterweight 46 acts to allow flapper 42 to move out of the way, by counterweight 46 being lifted and further acts to return the flapper to the blocking position by the counterweight 46 dropping down and urging the flapper to rotate back.

Flapper 42 may include portions that project both over and under guide rail 18. In the illustrated embodiment, for example, flapper 42 includes a slot 42*a* and flapper 42 is installed to pivot relative to the guide rail with guide rail 18 in slot 42*a*.

Flapper 42 is configured such that it cannot be moved from the blocking position in a direction opposite the arrow S. In particular, once in the blocking position, flapper 42 cannot be pivoted further to allow a pig to pass back from drop tube 36 to guide rails 18. For example, one or more stops, including for example a stop wall 43 and/or closed end of slot 42*a*, are provided to stop the flapper in the blocking position and prevent it from rotating back. Also or alternately, flapper 42 when in the blocking position is held at an angle towards the drop tube so that force against flapper 42 tends to be transferred in plane along the flapper and tends not to urge reverse rotation about the connection 44.

Alternately or in addition, the launching mechanism may include a pig positioning mechanism. The pig positioning mechanism maintains the pig in a position within drop tube 36 with its axis x in a generally vertical orientation in the drop tube. Drop tube 36 is selected to have an inner diameter just slightly larger than the outer diameter (across ribs) of the pigs to be launched. As such, a pig in drop tube is surrounded by the drop tube semi cylindrical inner facing walls and supported against falling over, Additionally, in one embodiment for example, the pig positioning mechanism includes a guide rail extension 50 in the drop tube that supports the pig after it is pushed into the drop tube and with the pig's axis x substantially vertical. While guide rail extension 50 is separate from the guide rails 18 and is moveable, extension 50 has a shape similar to a guide rail 18 such that extension 50 can support fin 4*b* of a pig introduced to drop tube 36. Guide rail extension 50, for example, may have an inwardly projecting length and a thickness similar to those dimensions of guide rails 18. Guide rail extension 50, while separate from guide rail 18, may be positioned in drop tube 36, in this embodiment within the wall of drop tube 36, in substantial alignment with one of the guide rails 18 of the frame. For example, guide rail extension 50 may have an upper surface substantially coplanar with the upper surfaces of guide rails 18. Additionally, there may only be a small gap between guide rail extension 50 and the adjacent guide rail 18. For example, guide rail extension 50 may be shaped such that its edge 50' along guide rail 18 follows the planar shape of the end 18*a* of the guide rail. For example, as shown in FIG. 6, end 18*a* of the guide rail at the launching end may have a tapering projecting edge leading to drop tube 36 and edge 50' of the guide rail extension may be shaped to define a projecting portion that substantially follows that tapering end 18*a* to reduce any gap between the parts.

While only one guide rail extension is employed in the illustrated embodiment, there may be a guide rail extension on each side, one opposite each guide rail 18.

Guide rail extension 50 is moveable between a support position, wherein it protrudes into the drop tube, and a retracted position, wherein it moves, arrow C, out of the support position. In the retracted position, guide rail extension 50 no longer supports the pig and the pig is allowed to drop, arrow D, by gravity out of the drop tube.

Guide rail extension 50 may be moved between the retracted position and the support position by various means such as by moving in and out of the drop tube, by pivoting, etc. Various mechanisms may be employed to control movement of the guide rail extension between its support and retracted positions. In one embodiment, guide rail extension 50 is controlled to automatically release before the drive system is readied to move a next pig forward.

One mechanism for controlling movement of the guide rail extension is illustrated wherein guide rail extension 50 is connected by a pivotal connection 52 in drop tube and the connection may permit the guide rail extension to pivot between the support position and the retracted position. Guide rail extension 50 may be biased to return to the support position after it retracts. Guide rail extension 50 may be biased by various means such as a spring or, as illustrated here, a counterweight 54 to rotate about connection 52 to return to the support position. Counterweight 54 is connected diametrically opposite the guide rail extension across connection 52.

Guide rail extension 50 may work with a lock mechanism 56 that holds guide rail extension 50 in the support position but can be actuated to allow guide rail extension 50 to collapse. The lock mechanism can be linked to the pig launching apparatus drive system. In one embodiment, for example, to ensure the guide rail extension 50 is supported when the leading pig 4*a* is first pushed into the drop tube, the lock mechanism may be configured (i) to lock the guide rail extension in the support position when the drive bar is driven forwardly, but (ii) to release the guide rail extension to be free to collapse, and therefore retract, when the drive bar is driven rearward (arrow R).

The lock mechanism may also or alternately be configured to sense if the guide rail extension has not returned to the support position, for example the guide rail extension is broken or held in a retracted position by a jammed pig. In one embodiment, the lock mechanism stops operation of the drive mechanism if the guide rail extension is sensed as remaining in the retracted position.

In one embodiment, for example, lock mechanism 56 includes link assembly to transfer movement of drive bar 26 to protrusion 50. Link assembly interacts with the drive bar to toggle the lock mechanism between the unlocked and the locked position, thereby providing the correct timing to engage and disengage the lock to controls the guide rail extension to be locked in the support position when a pig is being loaded and to be unlocked when the drive bar is being pulled back to reset behind the next pig to be pushed into the drop tube.

The link assembly may include, as illustrated, a lever 58 engaged at eye 59 pivotally about a pin 60 on drive bar 26 and connected at fulcrum 62 to a connecting bar 64 and at a ground pivot 66 to a fixed bar 68. Fixed bar 68 is connected at ends 68*a* to frame 10 and is thereby fixed against movement. Connecting bar 64 moves axially with drive bar 26. In particular, movement of drive bar 26 moves pin 60, which is translated by lever 58 to generate axial movement of connecting bar 64. Fixed bar 68 limits movement of connecting bar 64 in both directions.

Connecting bar 64 is connected via a pivotal connection 70 to a lock lever 72, which engages guide rail extension 50. Axial movement of connecting bar 64 drives lock lever 72 about a hinge 74 into and out of engagement with guide rail extension 50. When engaged with guide rail extension 50, lock lever 72 supports guide rail extension 50 against collapsing about connection 52. However, when lock lever 72 is removed from engagement with the guide rail extension, it can collapse. Once extension collapses and the pig drops, extension 50 can pivot back up about connection 52 due to counterweight 54. However, lock lever 72 will not be pivoted under extension 50 again until drive bar 26 is again driven forwardly.

Lock lever 72 in this embodiment, has a shape to underlie guide rail extension 50 when it is in the support position. If guide rail extension 50 fails to return to the support position, lock lever 72 is prevented from pivoting under guide rail extension 50, which, through connecting bar 64 and lever 58 prevents drive bar 26 from being driven forward and stops the forward movement of the pigs. If this were to occur, an investigation would be undertaken to determine why the drive bar has been stopped, which would identify the difficulty with the link or the extension 50 having failed to return to the support position.

Lock mechanism 56 can be installed about the outside of drop tube 36 so that the interior of drop tube remains relatively clear.

Figure 9:
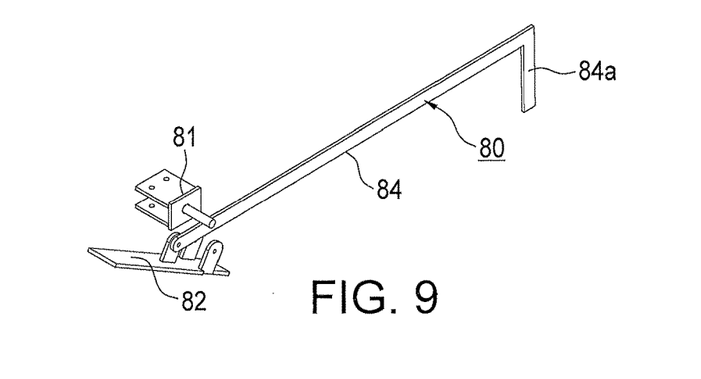
FIG. 9 is a perspective view of a brake useful in a pig launching apparatus.

As shown in FIGS. 5 and 9, the pig launching apparatus may further include a brake 80 that can be actuated to stop all movement of drive bar 26. Brake 80 includes a brake bar 82 configured to be rotatable into a brake position to block drive bar 26 from any forward movement and an actuator 84 connected to brake bar 82, through which brake bar 82 can be moved into and out of the brake position. Brake bar 82 may be connected pivotally to frame 10, as at connection 86, so that it can be pivoted between the brake position and the disengaged position (shown in FIG. 5). In the illustrated embodiment, brake bar 82, when in the brake position, engages bars 26, 28 so that they cannot move. This ensures that fingers 22 are locked in one position, such as in a retracted position. In one embodiment brake 80 is configured to hold the fingers retracted for removal of pigs. In such an embodiment for example, brake 80 is intended to be used when cylinder 32 is reversing the bars 26, 28 and, as such, fingers 22 are retracted from out of the elongate space. In such an embodiment, the bars may include a notch into which an end of brake bar 82 may be engaged to hold the bar and in this position with fingers 22 retracted from out of the elongate space. This may hold the bars in a position not fully at their rearward position and brake bar 82 may secure the bars against further rearward movement even though cylinder 32 may be driving the bars back.

Brake bar 82 may be pivoted into the brake position by pulling on the actuator 84. Brake bar 82 may be disengaged by various means such as pushing on the actuator 84. In one embodiment, however, where brake bar 82 is engaged to secure the bars 26, 28 against further rearward movement, bar 82 will fall out of engagement when the bars 26, 28 are moved forwardly. Bar 82 may be configured to have its outboard end heavier than the force holding the bar up. Thus, bar 82 falls away from its braking position when bars 26, 28 are moved forwardly. Actuator 84 may be sized to fit within housing alongside frame with a handle 84a accessible at loading end 10b.

A summary of the operation of the illustrated pig launching apparatus is as follows:

Pigs 4 are loaded to the pig launching apparatus with each pig supported by its fin on guide rails and its body in the space between the guide rails. The pigs are loaded to be in a line, each pig 4 has therebehind a finger 22 of the drive system such that along the length of the guide rails from launching end rearward, after lead pig 4i, there is a finger, then a pig, then a finger, etc. in sequence with at least one finger behind the last pig.

When the launcher is loaded and ready to operate, cylinder 32 is fully retracted and the pigs are resting on guide rails (FIG. 1). Drive bar 26 is fully retracted in its rear most position and the actuator bar 28 is also retracted to the rear thus locking the drive fingers in the protruding position, extending perpendicular to the length of the rails and long axis X1. Pig 4i in the lead position sits on the guide rails and is adjacent to but outside the drop tube. The bias in pig stop 40 prevents lead pig 4i from creeping forward into the drop tube. The counterweight has moved the guide rail extension to the support position. In this support position, the guide rail extension is aligned with one of the guide rails.

When a signal to launch a pig is received, the motive source drives the launching apparatus through a cycle to launch a pig. In this illustrated embodiment, when the drive system is energized, cylinder 32 begins to extend its rod to its full stroke. As cylinder 32 is extending, drive shaft 30b is driven to rotate and transfers the force through the wall of housing 8 to rotate internal levers 30a. This forces drive bar 26 forward along with actuator bar 28. Actuator bar 28 continues to maintain fingers 22 locked perpendicular to the rails 18. Each drive finger makes contact with the pig directly in front of it and thus movement of the pins forwardly forces the pigs to slide forward along guide rails 18.

As well, as the motive source 32 begins to advance the drive bar, the forward end of the drive bar engages and pushes on the eye of lever 58. This acts via the linkage to cause the lock lever 72 to pivot on its hinge 74. As lock lever 72, the outboard end of the lock lever 72a swings under a tab on the guide rail extension 50. This locks the guide rail extension, preventing it from rotating about the pivot 54.

As the drive bar advances further, it moves the lead pig forwardly, past pig stop 40 and into drop tube 36. As the pig passes pig stop 40, it biases out of the way. However, after pig 4i passes, the pig stop biases back into the path pig movement along the guide rails and stops the pigs from moving back out of the drop tube. Because of the configuration of pig stop 40, it cannot be overcome even if strong forces are applied against pig.

When driven, pig 4i is moved substantially horizontally into the drop tube and onto the guide rail extension, without the pig dropping down. Since the guide rail extension is locked in its position by the lock lever 72, it cannot rotate about its hinge. Walls 36 are shaped to follow the outer circumferential shape of the pigs to be launched and, for example, may be substantially cylindrical and have an inner diameter just larger than the pig. As such walls 36 closely surround the pig and keep it from tipping, while the guide rail extension holds it from dropping down. The pig is thereby retained substantially vertically in position in the drop tube.

At the end of the drive cylinder forward stroke (FIG. 2), the lead pig 4i has been pushed fully into the drop tube and by action of guide rail extension is properly oriented substantially vertically and is restrained from dropping.

When it is time to launch the lead pig 4i, external cylinder 32 is deenergized causing it to complete the cycle and retract to its fully retracted position (FIG. 3). The external lever 30c rotates drive shaft 30b and internal lever 30a back to their original positions. This reverses the motion of the drive bar 26. In particular, lever 30a pulls drive bar 26 toward the rear of the housing. The actuator bar 28 hangs up and stops moving with drive bar 26. This, thereby, causes drive fingers 22 to rotate out of the elongate space and into the retracted position where they can bypass the pigs as they are pulled back by drive bar 26. This ensures that pigs 4 remain in their previously advanced positions with a new lead pig adjacent drop tube 36.

After the drive fingers have been moved back, link arm 27 is stopped, here against support leg 20, and pivots to cause actuator bar 28 to move faster toward the rear, loading end 10b of the rails. As actuator bar 28 catches up with drive bar 26, this causes fingers 22 to swing back to the protruding position.

The reverse motion also acts on the lever and causes the lock lever 72 to be disengaged from beneath the guide rail extension. Once the lock lever 72 moves clear of the guide rail extension, the weight of the pig overcomes the counterweight 58 and allows the rail extension 50 to pivot about its hinge, and thereby collapse (arrow C). This releases the pig to drop straight down (arrow D) out of drop tube 36, into spool 90 and therethrough into pipeline 6.

Once the pig clears the rail extension, the counterbalance weight causes the rail extension to swing back to the support position. The cycle is then ready to be repeated to launch a next pig, which will occur the next time cylinder 32 is energized.

On occasion it is necessary to reload the launcher apparatus prior to all previously loaded pigs being launched. To facilitate the proper sequencing of pigs, any pigs remaining in the housing may be removed. In such a situation, the drive fingers 22 are retracted out of the elongate space, and thereby out of engagement with the pigs, and it is desirable that the fingers are locked in this retracted position. Brake 80 may be employed for this purpose. In particular, brake handle 84a may be pulled toward the rear of the housing to swing brake 82 up to engage and isolate both the drive bar and the actuator bar, which holds the fingers retracted. The pigs can then be slid rearwardly off the guide rails, without being caught up on the fingers.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A pig launching apparatus comprising:
   a frame including a first guide rail with a first pig supporting surface and a second guide rail with a second pig supporting surface, the first guide rail extending substantially parallel to, and spaced apart from, the second guide rail, the first guide rail and the second guide rail configured to support a pig on the first and second pig supporting surfaces;
   a drop tube at an end of the frame into which the pig is positioned for dropping into a pipeline;
   a drive system including a pushing finger protruding into the frame, the drive system configured to move through a cycle from a starting position through a forward stroke to move the pushing finger toward the drop tube and a rearward stroke to pull the pushing finger back to the starting position, the forward stroke moving the pushing finger to push the pig axially along the first and second pig supporting surfaces;
   an extension of the first guide rail in the drop tube, the extension being moveable between (i) a support position for supporting the pig in a substantially vertical position in the drop tube and (ii) a release position wherein it can release the pig to drop out of the drop tube; and
   a lock mechanism for the extension, the lock mechanism configured to alternately lock the extension in the support position and release the extension for movement to the release position, the lock mechanism configured to release the extension when the drive system moves through the rearward stroke.

2. The pig launching apparatus as defined in claim 1, wherein the extension is biased into the support position.

3. The pig launching apparatus as defined in claim 1, wherein the lock mechanism includes a linkage mechanically connected to the drive system.

4. The pig launching apparatus as defined in claim 1, wherein the extension has an upper surface positioned in substantially the same plane as the first and second pig supporting surfaces.

5. The pig launching apparatus as defined in claim 1, further comprising a pig stop configured to stop the pig from moving from the drop tube to the first and second pig supporting surfaces.

6. The pig launching apparatus as defined in claim 1, further comprising a brake for locking the pushing device in an inactive condition.

7. A method for launching a pig into a pipeline, comprising: providing the pig launching apparatus of claim 1; loading the pig into the pig launching apparatus to rest on the pair of guide rails; driving the drive system to push the pig along the guide rails into the drop tube at an end of the guide rails; accommodating the pig in the drop tube on the guide rail extension, the guide rail extension holding the pig in a proper orientation, against tipping, within the drop tube; driving the drive system to move a next pig along the guide rails and into the drop tube; and actuating the guide rail extension release the pig from the drop tube to thereby launch the pig into the pipeline, wherein driving the drive system to move a next pig actuates the guide rail extension to release a pig from the drop tube.

8. The method of claim 7, further comprising returning the guide rail extension to the releasably locked support position before the next pig is driven into the drop tube.

9. The method of claim 8, further comprising shutting down the drive system where returning the guide rail extension fails to configure the guide rail extension in the releasably locked support position.

10. The method of claim 7, further comprising pushing the pig past a pig stop to enter the drop tube, the pig stop preventing the pig from moving out of the drop tube back onto the guide rails.

* * * * *